(12) United States Patent
Sobanski et al.

(10) Patent No.: US 12,195,191 B2
(45) Date of Patent: Jan. 14, 2025

(54) AIRCRAFT PROPULSOR AND METHOD FOR USING SAID PROPULSOR

(71) Applicant: Raytheon Technologies Corporation, Farmington, CT (US)

(72) Inventors: Jon E. Sobanski, Glastonbury, CT (US); Paul R. Hanrahan, Sedona, AZ (US); Joseph B. Staubach, Colchester, CT (US); Jill Klinowski, Tolland, CT (US)

(73) Assignee: RTX CORPORATION, Farmington, CT (US)

( * ) Notice: Subject to any disclaimer, the term of this patent is extended or adjusted under 35 U.S.C. 154(b) by 336 days.

(21) Appl. No.: 17/535,200

(22) Filed: Nov. 24, 2021

(65) Prior Publication Data

US 2023/0159175 A1    May 25, 2023

(51) Int. Cl.
  *B64D 27/24*    (2024.01)
  *B64C 11/28*    (2006.01)
  *B64C 39/10*    (2006.01)
  *B64D 27/40*    (2024.01)
  *B64D 29/02*    (2006.01)

(52) U.S. Cl.
  CPC .............. *B64D 27/24* (2013.01); *B64C 11/28* (2013.01); *B64C 39/10* (2013.01); *B64D 27/40* (2024.01); *B64D 29/02* (2013.01)

(58) Field of Classification Search
  CPC ........ B64D 27/24; B64D 27/26; B64D 29/02; B64D 2027/262; B64D 27/40; B64C 11/28; B64C 39/10
  See application file for complete search history.

(56) References Cited

U.S. PATENT DOCUMENTS

2020/0361622 A1*  11/2020  Groninga ................. B64C 27/28
2022/0204171 A1*   6/2022  Veilleux, Jr. ........... B64D 27/24
2023/0249812 A1*   8/2023  Besse ..................... B64D 29/00
                                                                244/54

FOREIGN PATENT DOCUMENTS

DE           2916944 A1 * 11/1980 ............. B64C 11/28
DE        29511046 U1 * 12/1995 ............. B64C 11/28
(Continued)

OTHER PUBLICATIONS

Translation of DE-2916944-A1 (Year: 1980).*
Translation of DE-29511046-U1 (Year: 1995).*
EP search report for EP22209488.0 dated Mar. 16, 2023.

*Primary Examiner* — Richard Green
*Assistant Examiner* — Steven J Shur
(74) *Attorney, Agent, or Firm* — Getz Balich LLC

(57) ABSTRACT

A propulsor includes a propulsor body and a prop assembly in rotational communication with the propulsor body. The prop assembly includes a plurality of prop blades configured for rotation about an axial centerline of the propulsor. The plurality of prop blades are rotatable between a deployed position and a stowed position. The propulsor further includes at least one linkage having a first linkage end and a second linkage end. The first linkage end of the at least one linkage is rotatably mounted to the propulsor body and the second linkage end is configured to be rotatably mounted to an aircraft body. The propulsor further includes a first motor coupled to the at least one linkage and configured to rotate the at least one linkage relative to the propulsor body between a first rotational position and a second rotational position.

20 Claims, 7 Drawing Sheets

(56) References Cited

FOREIGN PATENT DOCUMENTS

| | | | | |
|---|---|---|---|---|
| DE | 3741857 C2 | 5/1999 | | |
| DE | 102010025488 B4 | 10/2012 | | |
| DE | 102013010084 A1 | 12/2014 | | |
| DE | 102014000640 B4 | 6/2020 | | |
| DE | 102019219255 B4 | 10/2021 | | |
| EP | 3798123 A1 * | 3/2021 | ............. | B64C 11/28 |
| WO | WO-2021255373 A1 * | 12/2021 | ............. | B64C 11/06 |

* cited by examiner

AIRCRAFT PROPULSOR AND METHOD FOR USING SAID PROPULSOR

BACKGROUND

1. Technical Field

This disclosure relates generally to electric and hybrid-electric aircraft, and more particularly to propulsion systems and methods for said aircraft.

2. Background Information

Electric and hybrid-electric propulsion systems for aircraft may be configured to convert electrical power into rotational energy to drive a propulsor, such as a propulsion fan or propeller ("prop"), to provide thrust for the aircraft. Aircraft including said propulsion systems may experience large disparities in thrust requirements during various flight conditions of the aircraft such as cruising, takeoff, landing, etc. Conventional steps to improve thrust capability to address all contemplated flight condition requirements have frequently been accompanied with reduced propulsive efficiency as well as increased weight and aerodynamic drag. Accordingly, there is a need for improved electric and hybrid-electric propulsion system architectures.

SUMMARY

It should be understood that any or all of the features or embodiments described herein can be used or combined in any combination with each and every other feature or embodiment described herein unless expressly noted otherwise.

According to an aspect of the present disclosure, a propulsor includes a propulsor body and a prop assembly in rotational communication with the propulsor body. The prop assembly includes a plurality of prop blades configured for rotation about an axial centerline of the propulsor. The plurality of prop blades are rotatable between a deployed position and a stowed position. The propulsor further includes at least one linkage having a first linkage end and a second linkage end. The first linkage end of the at least one linkage is rotatably mounted to the propulsor body and the second linkage end is configured to be rotatably mounted to an aircraft body. The propulsor further includes a first motor coupled to the at least one linkage and configured to rotate the at least one linkage relative to the propulsor body between a first rotational position and a second rotational position.

In any of the aspects or embodiments described above and herein, in the deployed position, the plurality of prop blades may extend in a first direction substantially radially outward from the axial centerline and, in the stowed position, the plurality of prop blades may extend in a second direction substantially axially with respect to the axial centerline.

In any of the aspects or embodiments described above and herein, the prop assembly may further include a hub configured for rotation about the axial centerline and each prop blade of the plurality of prop blades may be rotatably mounted to the hub.

In any of the aspects or embodiments described above and herein, the propulsor may further include a first shaft configured for rotation about the axial centerline and the first shaft may be mounted to the hub and configured to apply a rotational force to the hub.

In any of the aspects or embodiments described above and herein, the propulsor may further include a second shaft configured for rotation about the axial centerline and the second shaft may be configured to effect rotation of the plurality of prop blades between the deployed position and the stowed position.

In any of the aspects or embodiments described above and herein, each of the first shaft and the second shaft may be in rotational communication with the first motor and the first motor may be configured to selectively effect rotation of the first shaft and the second shaft about the axial centerline.

In any of the aspects or embodiments described above and herein, each of the first shaft and the second shaft may be in rotational communication with a second motor which is different than the first motor. The second motor may be configured to selectively effect rotation of the first shaft and the second shaft about the axial centerline.

According to another aspect of the present disclosure, an aircraft includes an aircraft body including an exterior surface and defining an interior cavity. The aircraft further includes at least one propulsor mounted to the aircraft body and moveable between a first propulsor position in which the at least one propulsor is located inside the interior cavity and a second propulsor position in which the at least one propulsor is at least partially disposed outside the interior cavity. The at least one propulsor includes a propulsor body and a prop assembly in rotational communication with the propulsor body. The prop assembly includes a plurality of prop blades configured for rotation about an axial centerline of the at least one propulsor. The plurality of prop blades are rotatable between a deployed position and a stowed position. The at least one propulsor further includes at least one linkage having a first linkage end and a second linkage end. The first linkage end of the at least one linkage is rotatably mounted to the propulsor body and the second linkage end is rotatably mounted to the aircraft body. The at least one propulsor further includes a first motor coupled to the at least one linkage and configured to rotate the at least one linkage relative to the propulsor body between a first rotational position corresponding with the first propulsor position and a second rotational position corresponding with the second propulsor position.

In any of the aspects or embodiments described above and herein, the aircraft may further include a gas turbine generator configured to provide electrical power for the at least one propulsor.

In any of the aspects or embodiments described above and herein, the aircraft may further include a main propulsor fixedly attached to the aircraft body.

In any of the aspects or embodiments described above and herein, the aircraft may further include an energy storage device configured to provide electrical power for the at least one propulsor.

In any of the aspects or embodiments described above and herein, the energy storage device may include one or both of a battery and a capacitor.

In any of the aspects or embodiments described above and herein, the aircraft may further include an energy storage device in electrical communication with the gas turbine generator. The energy storage device may be configured to provide electrical power for the at least one propulsor.

In any of the aspects or embodiments described above and herein, the at least one propulsor may be configured as a pusher prop.

According to another aspect of the present disclosure, a method for providing thrust for an aircraft includes deploying a propulsor from a propulsor stowed position within an interior cavity of an aircraft body to a propulsor deployed position in which at least a portion of the propulsor is disposed outside of the interior cavity. The method further includes rotating a plurality of prop blades of the propulsor from a blade stowed position to a blade deployed position in which the plurality of prop blades extend in a substantially radial direction relative to an axial centerline of the propulsor. The method further includes providing thrust for the aircraft by rotating the plurality of prop blades about the axial centerline.

In any of the aspects or embodiments described above and herein, the step of deploying the propulsor may be performed in response to a predetermined flight condition.

In any of the aspects or embodiments described above and herein, the predetermined flight condition may include one or both of a takeoff condition or a go-around condition.

In any of the aspects or embodiments described above and herein, the method may further include providing electrical power for the propulsor with an energy storage device.

In any of the aspects or embodiments described above and herein, the energy storage device may include one or both of a battery and a capacitor.

In any of the aspects or embodiments described above and herein, the propulsor may be configured as a pusher prop.

The present disclosure, and all its aspects, embodiments and advantages associated therewith will become more readily apparent in view of the detailed description provided below, including the accompanying drawings.

DETAILED DESCRIPTION

Figure 1:
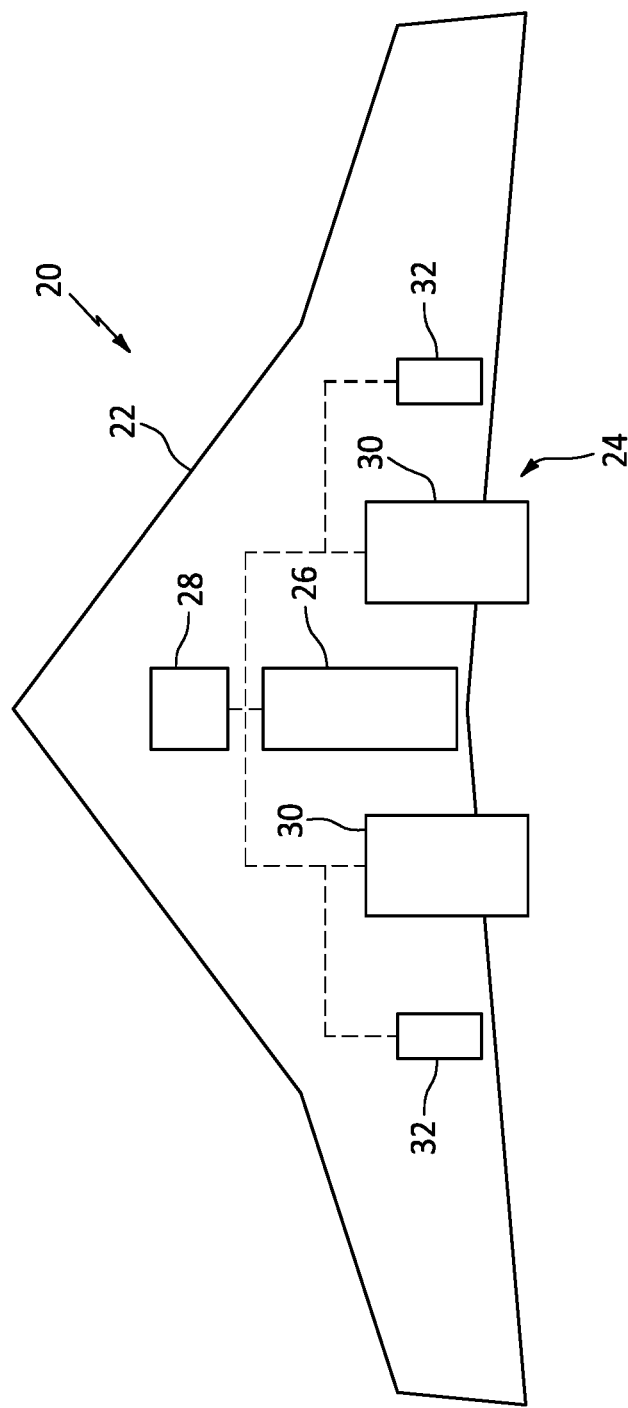
FIG. 1 illustrates a schematic plan view of an aircraft, in accordance with one or more embodiments of the present disclosure.

FIG. 1 schematically illustrates an aircraft 20. The aircraft 20 in the disclosed non-limiting embodiment is schematically illustrated having a "lifting body" configuration in which a fuselage 22 of the aircraft 20 produces lift. It should be appreciated, however, that any aircraft may benefit from aspects of the present disclosure and the configuration of the aircraft 20 should not be considered limiting.

The aircraft 20 generally includes the fuselage 22 and a propulsion system 24. In some embodiments, the propulsion system 24 may be configured as a hybrid-electric propulsion system or as a fully electric propulsion system. As shown in FIG. 1, for example, the propulsion system 24 may include a generator 26 configured to generate electrical power for operation of the propulsion system 24. In some embodiments, the generator 26 may be a gas turbine generator. However, the present disclosure is not limited to the use of a gas turbine generator and the propulsion system 24 according to the present disclosure may include other forms of electrical power generator such as, for example, by using a hydrogen fuel cell system or, in some embodiments, no form of electrical power generation for the propulsion system 24 at all. In some embodiments, the propulsion system 24 may additionally or alternatively include an energy storage device 28 for the storage of electrical energy for use by the propulsion system 24 and/or other electrical systems of the aircraft 20. The energy storage device 28 may be configured, for example, as one or more batteries, capacitors, and/or other suitable energy storage devices.

As shown in FIG. 1, the propulsion system 24 further includes one or more propulsors, for example, at least one main propulsor 30 and at least one auxiliary propulsor 32. As will be discussed in further detail, the main propulsor 30 may be fixedly mounted to the aircraft 20 and may be configured to provide all or the majority of the propulsive thrust throughout operation of the aircraft 20. The main propulsor 30 may be an electric propulsor powered, for example, by the generator 26. The auxiliary propulsor 32 may be movably mounted to the aircraft 20 and may be configured to provide additional propulsive thrust under certain predetermined flight conditions of the aircraft 20. FIG. 1 shows an exemplary arrangement of propulsion system 24 components including the generator 26, the energy storage device 28, main propulsors 30, and auxiliary propulsors 32, however, it should be understood that the propulsion system 24 of the present disclosure is not limited to the particular configuration, location, quantity, etc. of the propulsion system 24 components shown in FIG. 1.

Figure 2:
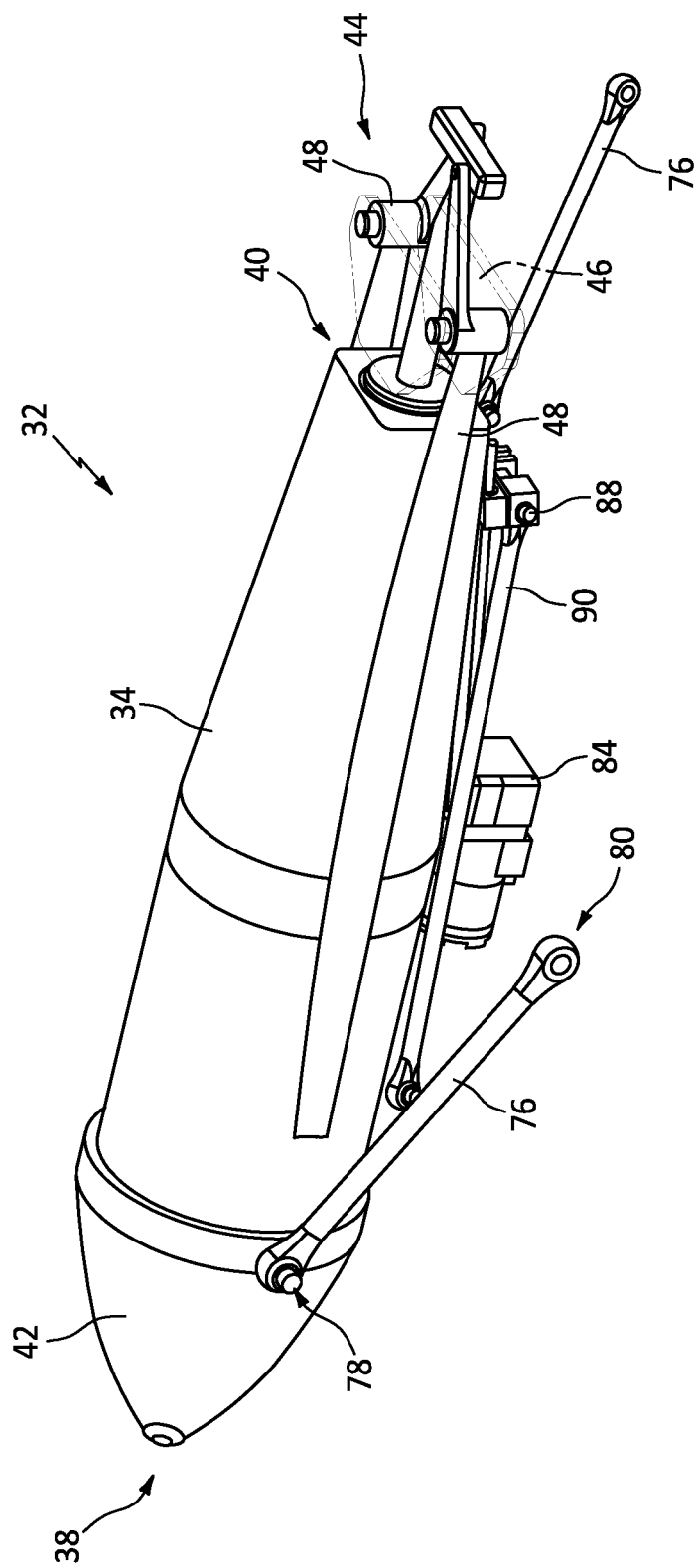
FIG. 2 illustrates perspective view of a propulsor including a plurality of prop blades in a stowed position, in accordance with one or more embodiments of the present disclosure.
Figure 3:
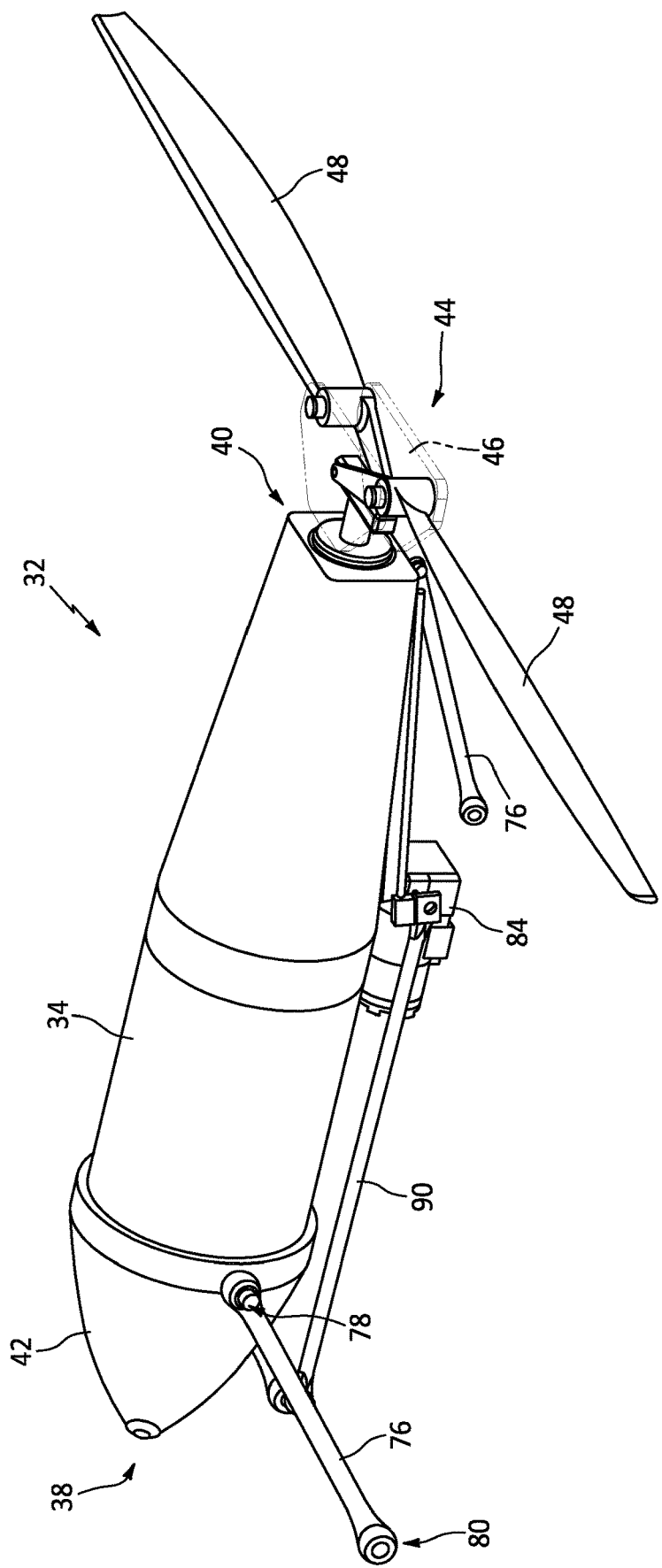
FIG. 3 illustrates perspective view of the propulsor of FIG. 2 including the plurality of prop blades in a deployed position, in accordance with one or more embodiments of the present disclosure.
Figure 4:
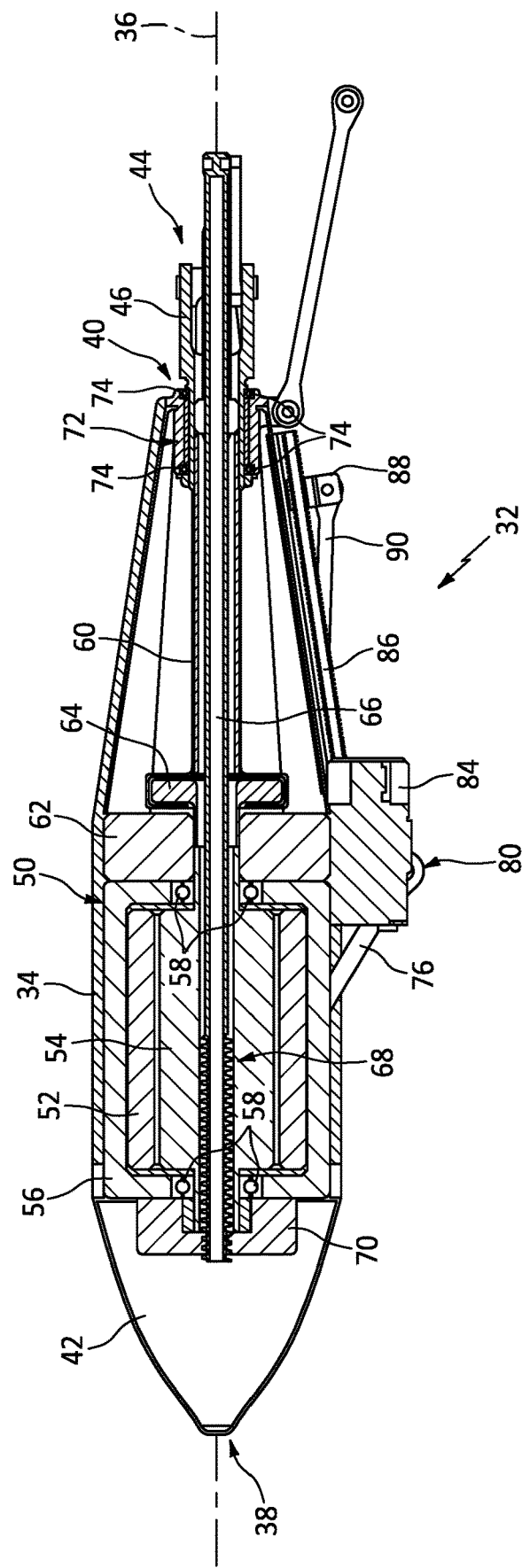
FIG. 4 illustrates a side, cross-sectional view of the propulsor of FIG. 2, in accordance with one or more embodiments of the present disclosure.

Referring to FIGS. 2-4, an embodiment of the present disclosure auxiliary propulsor (hereinafter "propulsor") 32 is illustrated. The propulsor 32 includes a propulsor body 34 forming an exterior housing the of propulsor 32 about an axial centerline 36 of the propulsor 32. The propulsor body 34 extends between a forward end 38 and an aft end 40. In some embodiments, the propulsor body 34 may include an aerodynamic fairing 42 located at the forward end 38 of the propulsor body 34. The aerodynamic fairing 42 may be unitarily formed with the propulsor body 34 to define the forward end 38 of the propulsor body 34. Alternatively, the aerodynamic fairing 42 may be detachably mounted to the downstream portions of the propulsor body 34 to allow access to internal components of the propulsor 32. It should be understood that relative positional terms, such as "forward," "aft," "upper," "lower," "above," "below," "upstream," downstream," and the like are relative to the normal operational attitude of the propulsor 32 and should not be considered otherwise limiting.

The propulsor 32 includes a prop assembly 44 in rotational communication with the propulsor body 34. The prop assembly 44 includes a hub 46, configured for rotation about the axial centerline 36, and a plurality of prop blades 48 mounted to the hub 46 and configured for rotation about the axial centerline 36 therewith. As shown in FIGS. 2 and 3, the plurality of prop blades 48 includes two prop blades 48, however, the present disclosure is not limited to any particular number of prop blades and the plurality of prop blades 48 may include, for example, 2, 3, 4, 5, 6, etc. prop blades 48 mounted to the hub 46. Each prop blade 48 of the plurality of prop blades 48 is rotatably mounted to the hub 46 and configured to rotate, relative to the hub 46, between a stowed position and a deployed position. In the deployed position, the plurality of prop blades 48 extend in a direction substantially radially outward from the axial centerline 36 such that rotation of the hub 46 causes the plurality of prop blades 48 to generate thrust in an aftward direction. In the stowed position, the plurality of prop blades 48 extend in a direction substantially axially with respect to the axial centerline 36 such that the plurality of pro blades 48 extend in a generally forward direction from the hub 46. Accordingly, the propulsor 32 may generally be configured as a "pusher prop" style propulsor. In the stowed position, the plurality of prop blades 48 may extend along and contact or otherwise be oriented proximate the propulsor body 34 so as to minimize the amount of stowage space required by the propulsor 32. As used herein, the term "substantially" with respect to a direction or angular relationship refers to the stated direction or angular relationship +/−ten degrees.

The propulsor 32 includes a motor 50 mounted within the propulsor body 34. The motor 50 may be configured as an electric motor configured to receive electrical power from the generator 26 and/or the energy storage device 28 of the propulsion system 24, as previously described. The motor 50 may generally include a stator member 52 and a rotor member 54 retained within a motor housing 56. The motor housing 56 may support one or more bearings 58 configured for rotational support of the rotor member 54.

The propulsor 32 includes a first shaft 60 configured for rotation about the axial centerline 36. The first shaft 60 is mounted to the hub 46 and configured to apply a rotational force from the motor 50 to the hub 46 to effect rotation of the plurality of prop blades 48 about the axial centerline 36. In some embodiments, the first shaft 60 may be selectively coupled with the rotor member 54 of the motor 50 by a gearbox 62 and a clutch 64. The gearbox 62 may include a planetary gearset, a star gearset, or the like. The clutch 64 may be configured as a centrifugal clutch, a hydraulicly actuated clutch, an electric-plate-based clutch, and the like, and the present disclosure is not limited to any particular clutch configuration. The clutch 64 may be selectively engaged with the rotor member 54 via the gearbox 62 to apply the rotational force from the motor 50 to the hub 46.

The propulsor 32 includes a second shaft 66 configured for rotation about the axial centerline 36 of the propulsor 32 and extending along the axial centerline 36 between the prop assembly 44 and the motor 50. The second shaft 66 may be coaxially oriented with the first shaft 60 about the axial centerline 36. In some embodiments, the second shaft 66 may extend along the axial centerline 36 through the motor 50 and/or the first shaft 60 as shown, for example, in FIG. 4. The second shaft 66 is configured to translate axially along the axial centerline 36, thereby effecting rotation of the plurality of prop blades 48 between the stowed position and deployed position. As shown in FIG. 4, the second shaft 66 may include a threaded portion 68 which may be selectively engaged by a clutch 70 to apply a rotational force from the motor 50 to the second shaft 66, thereby translating the second shaft 66 along the axial centerline 36. In some embodiments, the hub 46 may include one or more linear bearings positioned in contact with the second shaft 66 and configured to accommodate internal axial motion of the second shaft 66. In some embodiments, the second shaft 66 may include a splined portion having one or more linear splines extending through the hub 46 such that the second shaft 66 may axially translate within the hub 46 but remain rotationally fixed relative to the hub 46.

In some embodiments, the propulsor 32 may include a carrier 72 mounted to the aft end 40 of the propulsor body 34. The carrier 72 may axially retain the hub 46 while allowing the hub 46 to rotate within the carrier 72 about the axial centerline 36. Accordingly, the carrier 72 may include one or more bearings 74 configured to rotatably support the hub 46. In some embodiments, the carrier 72 may be a unitary portion of the propulsor body 34.

In some embodiments, the propulsor 32 may include one or more linkages 76. As shown in FIGS. 2-4, the linkages 76 may be rotatably mounted to the propulsor body 34, the carrier 72, or one or more other components of the propulsor 32. Each linkage 76 includes a first linkage end 78 rotatable mounted to the propulsor body 34, for example, and a second linkage end 80 configured to be rotatably mounted to an aircraft body 82 (e.g., a fixed structure such as the fuselage 22, a wing or nacelle of an aircraft, etc.). The linkages 76 are rotatable between a first rotational position and a second rotational position corresponding to a stowed position of the propulsor 32 and a deployed position of the propulsor 32, respectively. Accordingly, the linkages 76 are configured to moveably mount the propulsor 32 to the aircraft body 82 and to allow the propulsor 32 to move, relative to the aircraft body 82, between the stowed position and the deployed position.

In some embodiments, the propulsor 32 includes a motor 84, independent of the motor 50, configured to selectively effect rotation of the linkages 76 between the first linkage position and the second linkage position, and thereby selectively reposition the propulsor 32 between the stowed position and the deployed position. As shown in FIG. 4, the motor 84 may be configured as part of a ball screw linear actuator. The motor 84 may rotate a threaded shaft 86 having a ball screw nut 88 threadedly attached thereto. At least one drive linkage 90 may be connected to the ball screw nut 88 and a respective at least one linkage 76, thereby cause the respective at least one linkage 76 to rotate between the first linkage position and the second linkage position in response to rotation of the threaded shaft 86 by the motor 84. Each drive linkage 90 may be rotatably mounted to one or both of the ball screw nut 88 and a respective linkage 76. However, it should be understood that the present disclosure is not limited to use of the above-described ball screw linear actuator to effect rotating of the linkages 76 and other mechanisms for positioning the propulsor 32 between the stowed position and the deployed position may be contemplated.

Figure 5:
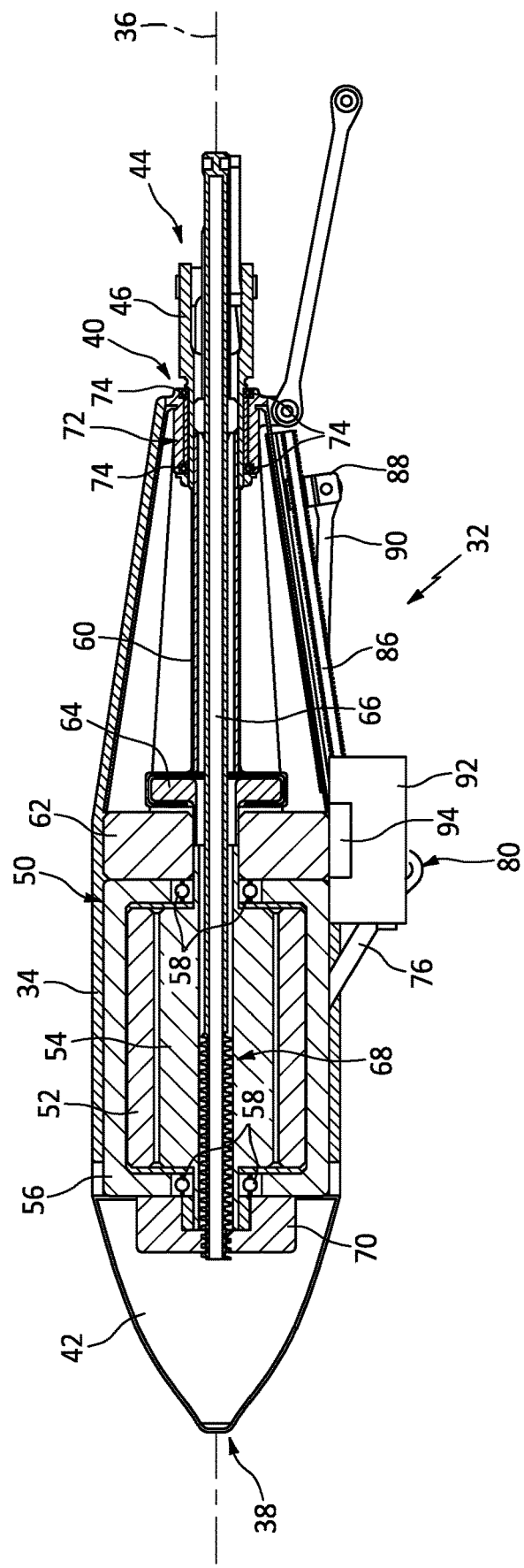
FIG. 5 illustrates a side, cross-sectional view of a propulsor, in accordance with one or more embodiments of the present disclosure.

Referring to FIG. 5, in some embodiments, the propulsor 32 may include a gearbox 92, instead of the motor 84, to effect rotation of the linkages 76. The gearbox 92 may be selectively engaged with the motor 50 using a clutch 94 which configured for selectively mechanical engagement with the motor 50 or the gearbox 62. For example, with the clutch 94 engaged, the motor 50 may cause the threaded shaft 86 to rotate via the gearbox 92, thereby rotating the linkages 76 as previously described.

Figure 6A:
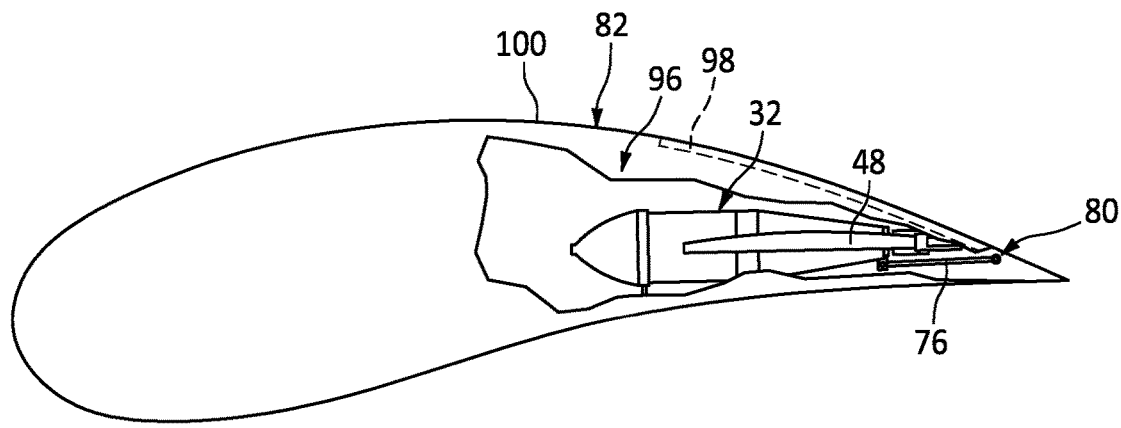
FIG. 6A-C illustrate side, cutaway views of an aircraft body having a propulsor mounted thereto, in accordance with one or more embodiments of the present disclosure.
Figure 6B:
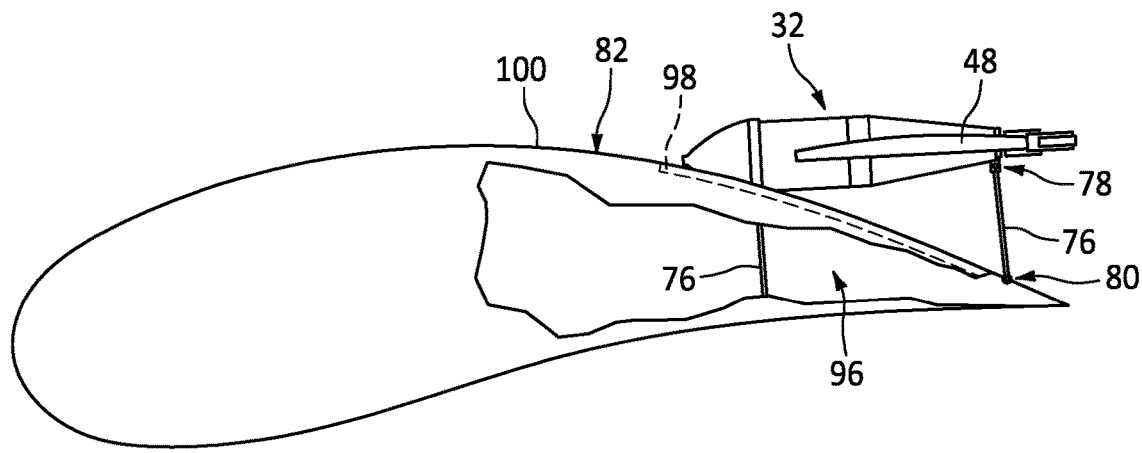
Figure 6C:
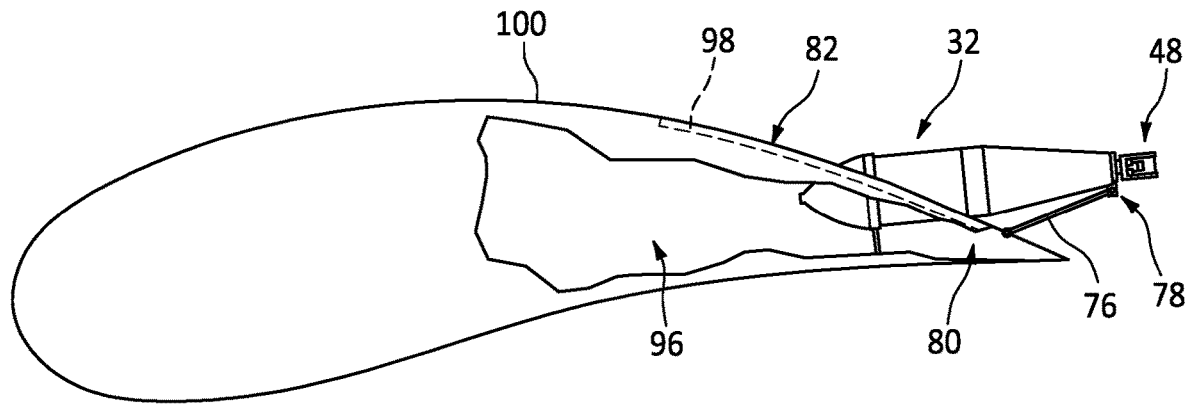
Figure 7:
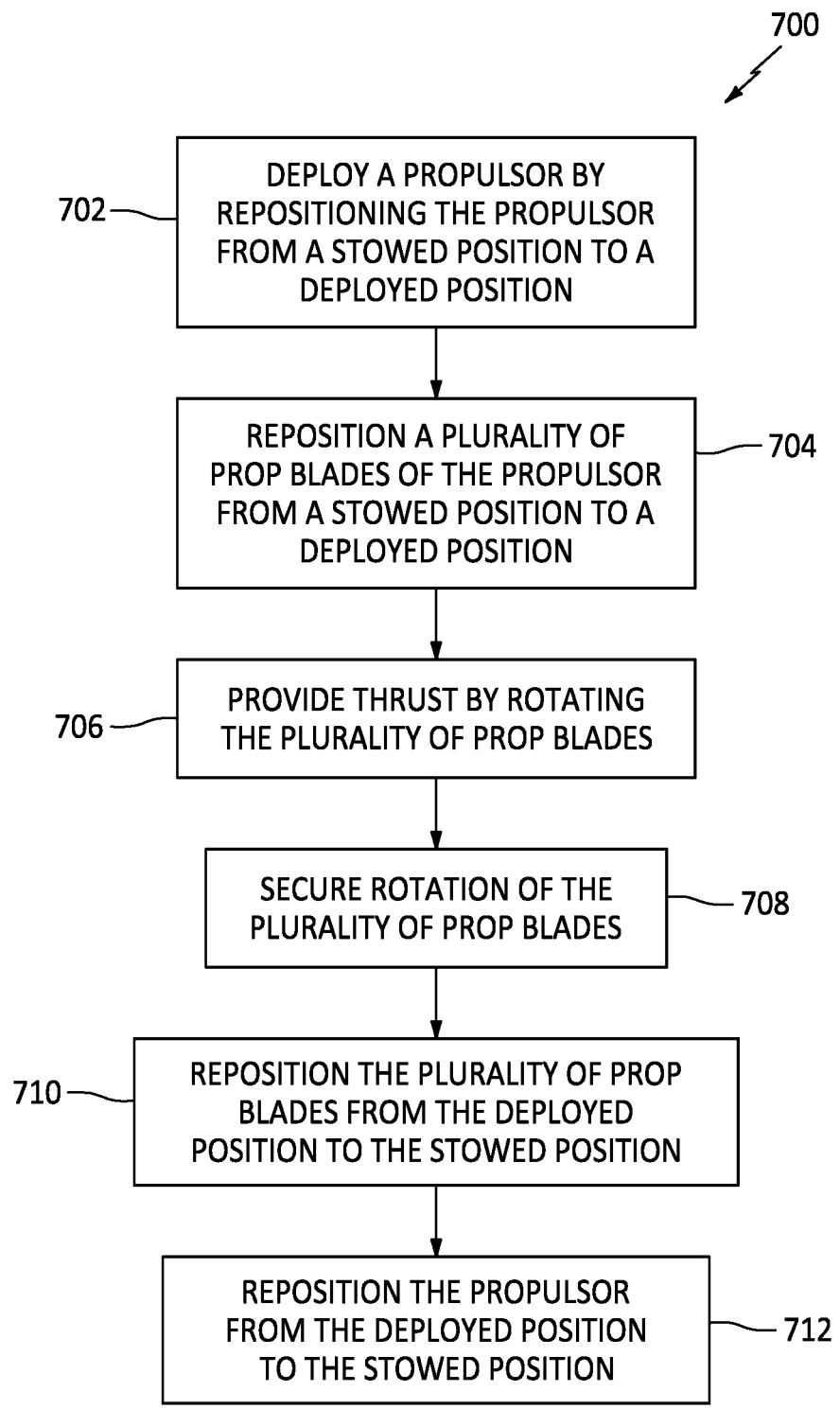
FIG. 7 illustrates a flowchart depicting a method for providing thrust for an aircraft, in accordance with one or more embodiments of the present disclosure.

Referring to FIGS. 6A-C and 7, aspects of the present disclosure include a method 700 for providing thrust for an aircraft, such as the aircraft 20. FIG. 6A-C illustrate side, cutaway views of the aircraft body 82 having the propulsor 32 mounted thereto in a stowed position (see FIG. 6A), an intermediate position (see FIG. 6B), and a deployed position (see FIG. 6C). Initially, the propulsor 32 may be located within an interior cavity 96 defined by the aircraft body 82. While the aircraft 20 is on the ground or during a flight condition of the aircraft 20 such as a cruising condition, the propulsor 32 may be stowed within the interior cavity 96, for example, to reduce or eliminate any aerodynamic drag from the propulsor 32. The aircraft body 82 includes an opening 98 extending between the interior cavity 96 and an exterior surface 100 of the aircraft body 82 to allow the propulsor 32 to be repositioned inside or outside of the interior cavity 96. In some embodiments, the aircraft body 82 may include a cover device (not shown) which may cover the opening 98 when the propulsor 32 is in the stowed position inside the interior cavity 96, thereby further reducing aerodynamic drag from the propulsor 32.

In some flight conditions of the aircraft 20 including, but not limited to, a takeoff condition or a go-around condition prior to landing, it may be desirable for the aircraft 20 to have increased thrust above what may be provided by the main propulsor(s) 30. Accordingly, Step 702 includes deploying the propulsor 32 by repositioning the propulsor 32 from the stowed position inside the interior cavity 96 to the deployed position, as discussed above. The propulsor 32 may be deployed in response to a predetermined flight condition in which it is known that additional thrust will be desired. Alternatively, the propulsor 32 may be selectively deployed during flight to increase available thrust. In the deployed position, all or at least a portion of the propulsor 32 (e.g., the plurality of prop blades 48) is located outside of the interior cavity 96 of the aircraft body 82. As previously discussed, in some embodiments, the aircraft 20 may include a plurality of propulsors 32. In some embodiments, all of the propulsors 32 of the aircraft 20 may be deployed during the flight condition to provide additional thrust for the aircraft 20. In some embodiments, less than all of the propulsors 32 may be deployed, depending on how much additional thrust may be desired for the flight condition.

In Step 704, the plurality of prop blades 48 are repositioned from the stowed position to the deployed position. In Step 706, the motor 50 operates to effect rotation of the plurality of prop blades 48 about the axial centerline 36, thereby providing additional thrust for the aircraft 20. In some embodiments, Step 706 may include operating the motor 50 to effect reverse rotation of the prop blades 48 allowing the propulsor 32 to operate as a thrust reverser, for example, during a landing condition of the aircraft 20.

In Step 708, rotation of the prop blades 48 about the axial centerline 36 is secured once the additional thrust provided by the propulsor 32 is no longer desired. In Step 710, the prop blades 48 are repositioned from the deployed position to the stowed position. In Step 712, the propulsor 32 is repositioned from the deployed position to the stowed position within the interior cavity 96 defined by the aircraft body 82. The Steps 708, 710, and 712 may be performed for all deployed propulsors 32 or may be performed for a subset of the deployed propulsors 32, as necessary to control the desired thrust for the aircraft 20.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A propulsor comprising:
    a propulsor body;
    a prop assembly in rotational communication with the propulsor body, the prop assembly comprising a hub and a plurality of prop blades, the hub and the plurality of prop blades are configured for rotation about an axial centerline of the propulsor, each prop blade of the plurality of prop blades is rotatably mounted to the hub and rotatable between a deployed position and a stowed position;
    at least one linkage having a first linkage end and a second linkage end, the first linkage end of the at least one linkage rotatably mounted to the propulsor body and the second linkage end configured to be rotatably mounted to an aircraft body;
    a first motor disposed within the propulsor body at the axial centerline, the first motor coupled to the at least one linkage, the first motor configured to rotate the at least one linkage relative to the propulsor body between a first rotational position and a second rotational position; and
    a first shaft extending along the axial centerline between and to the first motor and the hub, the first shaft configured for rotation about the axial centerline, the first shaft mounted to the hub and configured to apply a rotational force from the first motor to the hub.

2. The propulsor of claim 1, wherein, in the deployed position, the plurality of prop blades extend in a first direction substantially radially outward from the axial centerline and wherein, in the stowed position, the plurality of prop blades extend in a second direction substantially axially with respect to the axial centerline.

3. The propulsor of claim 1, further comprising a second shaft configured for rotation about the axial centerline, the second shaft configured to effect rotation of the plurality of prop blades between the deployed position and the stowed position.

4. The propulsor of claim 3, wherein each of the first shaft and the second shaft are in rotational communication with the first motor and the first motor is configured to selectively effect rotation of the first shaft and the second shaft about the axial centerline.

5. The propulsor of claim 3, wherein the second shaft is in rotational communication with a second motor, different than the first motor, the second motor configured to selectively effect rotation of the second shaft about the axial centerline.

6. The propulsor of claim 1, wherein in the first rotational position the propulsor body is in a propulsor stowed position relative to the aircraft body, and in the second rotational position the propulsor body is in a propulsor deployed position relative to the aircraft body.

7. The propulsor of claim 1, wherein a gearbox selectively engages the first motor using a clutch to rotate the at least one linkage relative to the propulsor body between the first rotational position and the second rotational position.

8. An aircraft comprising:
an aircraft body including an exterior surface and defining an interior cavity; and
at least one propulsor mounted to the aircraft body and moveable between a first propulsor position in which the at least one propulsor is located inside the interior cavity and a second propulsor position in which the at least one propulsor is at least partially disposed outside the interior cavity, the at least one propulsor comprising:
a propulsor body;
a prop assembly in rotational communication with the propulsor body, the prop assembly comprising a hub and a plurality of prop blades, the hub and the plurality of prop blades are configured for rotation about an axial centerline of the propulsor, each prop blade of the plurality of prop blades is rotatably mounted to the hub and rotatable between a deployed position and a stowed position;
at least one linkage having a first linkage end and a second linkage end, the first linkage end of the at least one linkage rotatably mounted to the propulsor body and the second linkage end rotatably mounted to the aircraft body; and
a first motor disposed within the propulsor body at the axial centerline, the first motor coupled to the at least one linkage, the first motor configured to rotate the at least one linkage relative to the propulsor body between a first rotational position corresponding with the first propulsor position and a second rotational position corresponding with the second propulsor position.

9. The aircraft of claim 8, further comprising a gas turbine generator configured to provide electrical power for the at least one propulsor.

10. The aircraft of claim 9, further comprising an energy storage device in electrical communication with the gas turbine generator, the energy storage device configured to provide electrical power for the at least one propulsor.

11. The aircraft of claim 8, further comprising a main propulsor fixedly attached to the aircraft body.

12. The aircraft of claim 8, further comprising an energy storage device configured to provide electrical power for the at least one propulsor.

13. The aircraft of claim 12, wherein the energy storage device includes one or both of a battery and a capacitor.

14. The aircraft of claim 8, wherein the at least one propulsor is configured as a pusher prop.

15. A method for providing thrust for an aircraft, the method comprising:
deploying a propulsor from a propulsor stowed position within an interior cavity of an aircraft body to a propulsor deployed position in which at least a portion of the propulsor is disposed outside of the interior cavity by rotating at least one linkage with a first motor, the at least one linkage rotatably mounted to the propulsor and the aircraft body, the first motor disposed within the propulsor;
rotating a plurality of prop blades of the propulsor, with the first motor, from a blade stowed position to a blade deployed position in which the plurality of prop blades extend in a substantially radial direction relative to an axial centerline of the propulsor; and
providing thrust for the aircraft by rotating the plurality of prop blades about the axial centerline with the first motor.

16. The method of claim 15, wherein the step of deploying the propulsor is performed in response to a predetermined flight condition.

17. The method of claim 16, wherein the predetermined flight condition includes one or both of a takeoff condition or a go-around condition.

18. The method of claim 15, further comprising providing electrical power for the propulsor with an energy storage device.

19. The method of claim 18, wherein the energy storage device includes one or both of a battery and a capacitor.

20. The method of claim 15, wherein the propulsor is configured as a pusher prop.

* * * * *